United States Patent [19]

Bechem et al.

[11] Patent Number: 5,685,615
[45] Date of Patent: Nov. 11, 1997

[54] ECCENTRICALLY DRIVEN PERCUSSIVE TOOLS FOR TREATING MATERIALS

[76] Inventors: Klaus Bechem; Ulrich Bechem; Philip Bechem, all of Tiefendorferstrasse 87, Hagen, Germany, 58093

[21] Appl. No.: 587,508

[22] Filed: Jan. 17, 1996

[51] Int. Cl.⁶ .............................. E21B 10/08; E21C 25/08
[52] U.S. Cl. .................. 299/110; 175/55; 299/85.1; 299/78
[58] Field of Search ............... 175/55, 398; 299/85.1, 299/78, 37.2; 5/110

[56] References Cited

U.S. PATENT DOCUMENTS 4,736,987  4/1988  Lenzen et al. ........................ 299/110
5,103,705  4/1992  Bechem ................................. 83/491
5,190,353  3/1993  Bechem ............................. 299/58 X

FOREIGN PATENT DOCUMENTS 3301671  7/1984  Germany ............................. 175/398

*Primary Examiner*—David J. Bagnell
*Attorney, Agent, or Firm*—Barnes & Thornburg

[57] ABSTRACT

An apparatus for treating rock, minerals or similar materials includes at least two tool-bearing sleeves supported by bearings. The tool-bearing sleeves are arranged in eccentric relationship to a common drive shaft. The tool-bearing sleeves are counterbalanced with reference to respective counterweights.

8 Claims, 3 Drawing Sheets

ECCENTRICALLY DRIVEN PERCUSSIVE TOOLS FOR TREATING MATERIALS

BACKGROUND TO THE INVENTION

Several systems exist for superimposing a percussive action on drilling, milling and ripping tools. They tend to reduce the required thrust forces and enhance drilling performance, particularly in hard rock. European patent application EP 88710058.4-2302 describes a system which is eccentrically activated, having a single eccentric drive and a tool for ripping particularly hard rock.

SUMMARY OF THE INVENTION

The new system claimed below permits an entire assembly to run considerably smoother by means of multiple eccentric drives having several tool-bearing sleeves. The system furthermore significantly reduces the required thrust forces and makes it feasible to work at optionally selected drilling or milling widths, either by pure percussion, or by percussive milling. The technology according to the present invention furthermore tends to eliminate bearing problems arising from excessive, mass and amplitude dependent centrifugal forces.

The claimed technology permits multi-directional planar milling, ripping, or full-bore drilling. Microtunnelling as well as tunnel drilling machines may be similarly equipped, having the advantage, among others, of permitting particularly hard materials, minerals or the like to be milled at roughly half of conventional machine masses.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

A drive shaft supported in cantilever fashion and carrying two eccentric drive portions for two sleeves and milling tools is propelled at 3000 revolutions per minute. The amplitude of the sleeve oscillations is 5 mm. Each tool-bearing sleeve is propelled at 100 revolutions per minute by way of a 30:1 reduction gear system. The width and diameter of each tool-bearing sleeve is 250 mm, giving an excavating width of twice 250 mm, thus 500 mm. A propulsive power of approximately 10 kW is required at a thrust of approximately 1 tonne for excavating hard rock. Conventional systems require multiples of these values.

Figure 1:
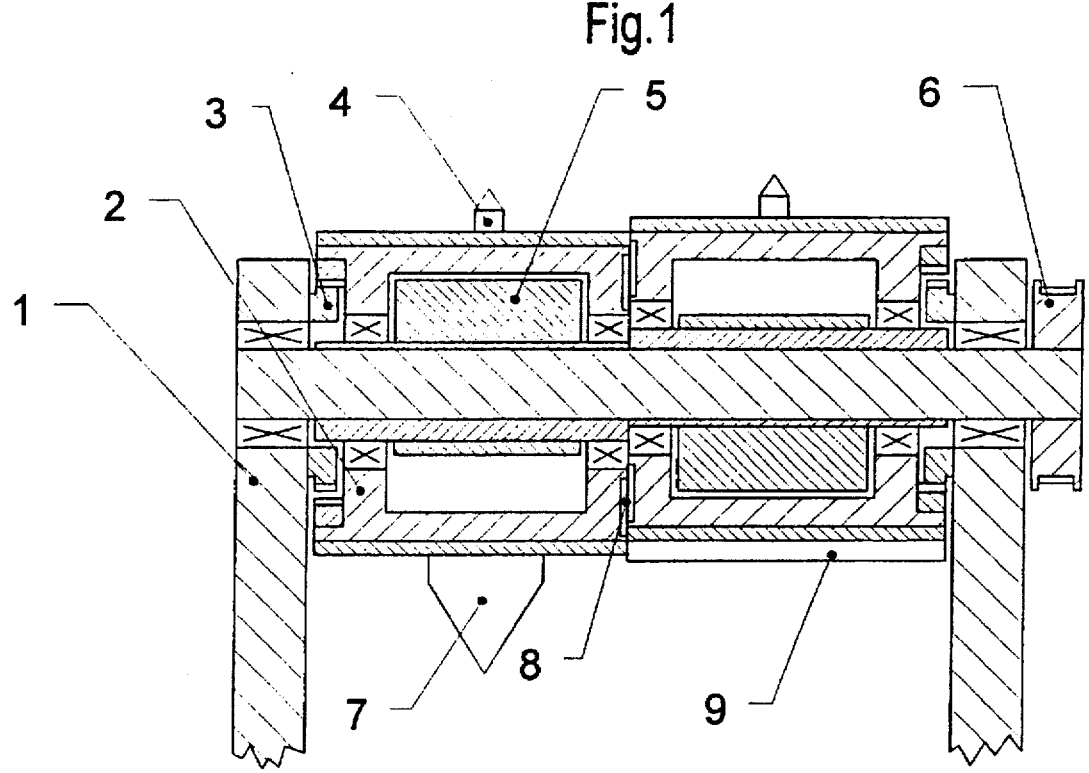
FIG. 1 illustrates a longitudinal sectional side elevational view of a device constructed according to the invention.

The drawings respectively show different feasible embodiments. In FIG. 1 item (1) constitutes a support structure, and item (2) one of the rotatable sleeves supported by bearings on an eccentric drive portion. Item (3) constitutes a reduction gear system comprising an internal and an external gear. Reference numeral (6) identifies the drive of a rapidly rotatable eccentric drive shaft, while item (7) constitutes a disk-like roller-drilling tool. Seals are respectively identified as item (8), while item (9) identifies an attachment for compacting floors and the like, using the sleeve as a rolling drum. Alternatively a plate may be used while dispensing with the propulsion for the tool-bearing sleeve. The tools themselves are interchangeable. The sleeves and tools are compensated/counterbalanced with reference to the counterweights (5).

Figure 2:
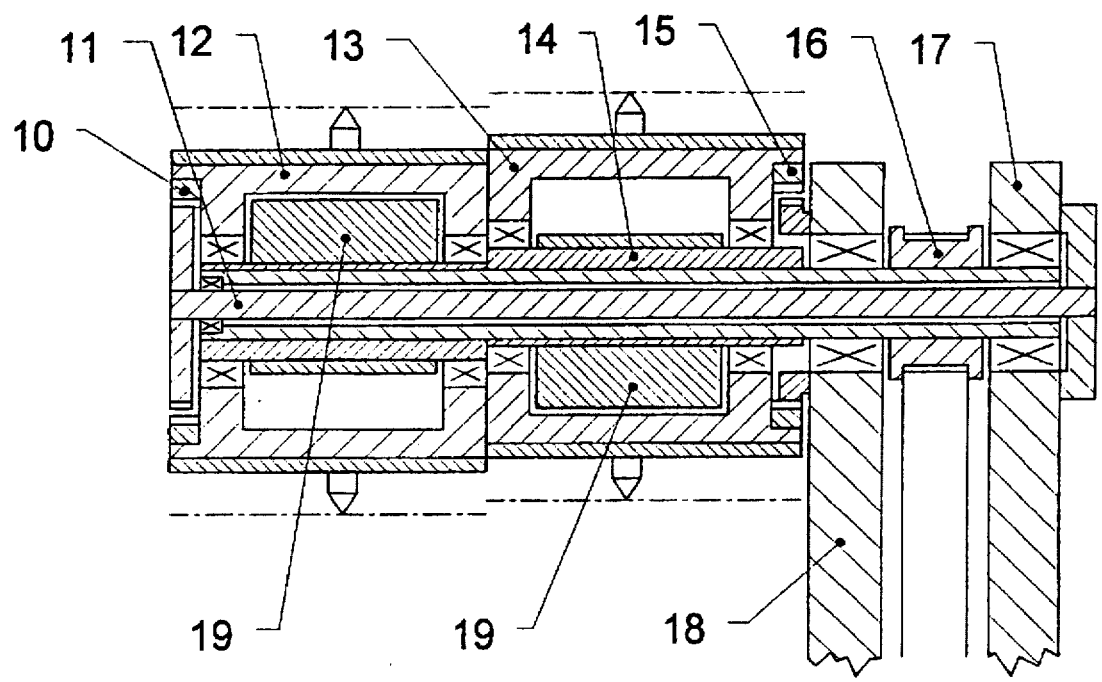
FIG. 2 illustrates a longitudinal sectional side elevational view of a device constructed according to the invention.

FIG. 2 shows a gear system (10) between a static internal shaft (11) and a remote sleeve (12). A second, inner sleeve (13) is supported in similar fashion to the sleeve (12) by bearings on an eccentric drive portion (14), and is slowly rotatable by way of a gear system (15). A common drive shaft is rapidly rotatable by way of a driven pulley (16). A support structure (18) carries the assembly described above. Counterweights (19), with reference to which the respective sleeves and tools are counterbalanced, are secured to/mounted on the eccentric shaft.

Figure 3:
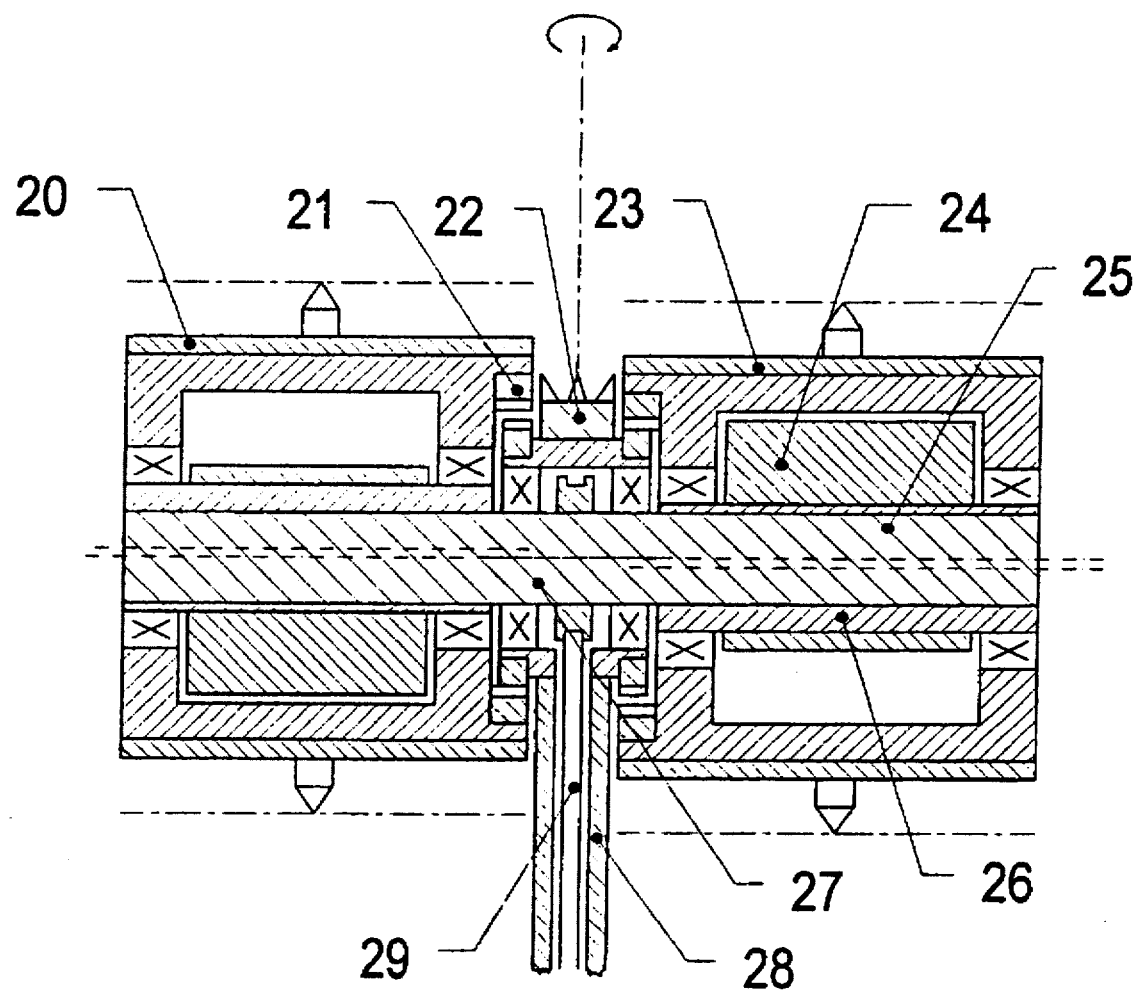
FIG. 3 illustrates a longitudinal sectional side elevational view of a device constructed according to the invention.

A centrally supported twin drive arrangement shown in FIG. 3, has one of a pair of tool-bearing sleeves (20) linked to an associated drive (21). Recessed picks or similar tools (22) are provided to dislodge possibly remaining ridges of unmined rock. The second tool-bearing sleeve (23) has a counterweight (24). A common drive shaft (25) carries eccentric drive portions, which may be optionally arranged in opposing disposition to each other, or aligned with each other for simultaneous percussion. The indicated eccentric drive portion (26) is preferably splined to fit slidingly on to the shaft (25) before being secured to it, for amplitude adjustment. A central support structure (28) accommodates a drive for the shaft (25) by way of a toothed drive belt (29), for example. As is evident from the indicated central axis line (27), the illustrated assembly is capable of producing pilot holes or full-bore drillings when rotated about this axis.

Figure 4:
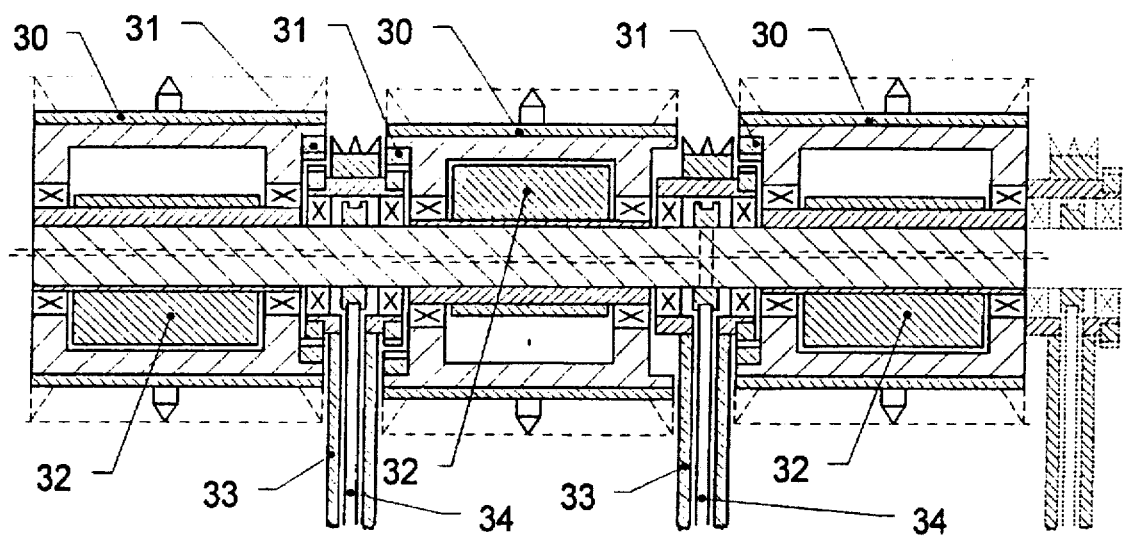
FIG. 4 illustrates a longitudinal sectional side elevational view of a device constructed according to the invention; and, FIG. 5 illustrates a longitudinal sectional side elevational view of a device constructed according to the invention.

FIG. 4 shows an assembly having 3 tool-bearing sleeves (30) of equal length and mass, each being slowly rotatable by a reduction gear system (31), and each being compensated/counterbalanced with reference to a corresponding counterweight (32). This system is also capable of operating as a percussive roller-drilling tool, either with or without propulsion of the tool-bearing sleeve. This assembly has two support structures (33) with drives including toothed belts (34), and may be optionally widened by the addition of further similar support structures and tools. Whenever more than 3 eccentric drives/tool-bearing sleeves are used, the sleeves are preferably supported in pairs by bearings on respective support structures from which they are propelled (as indicated in ghost outline).

Figure 5:
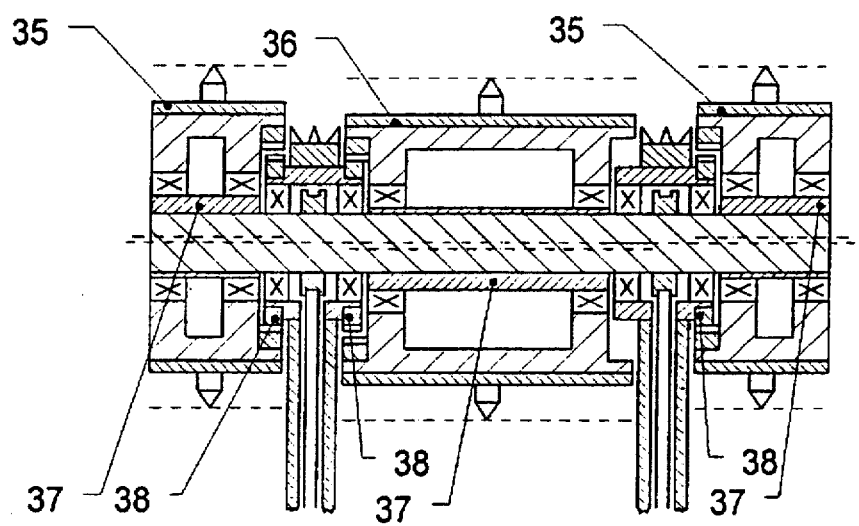

A preferred design for an assembly shown in FIG. 5, which dispenses with counterweights such as items (32) in FIG. 4, has two remote tool-bearing sleeves (35) of equal width and mass. A central tool-bearing sleeve (36) is twice as wide and heavy as either of the remote sleeves to ensure counterbalancing. This system accordingly functions at minimal vibration through optimal counterbalancing without employing separate counterweights. The remote eccentric drive portions (37) are arranged in opposing disposition to the central drive portion (37A), and respectively support rotatable sleeves (35) and (36) on bearings. They may, but need not necessarily, be driven by gear systems (38). The required support structures may be laterally mounted, in which case transfer drive means between the tool-bearing sleeves are required.

We claim:

1. An apparatus for treating at least one of rock and minerals which includes at least two tool-bearing sleeves supported by bearings, and arranged in eccentric relationship to a common drive shaft, and counterweights, the tool-bearing sleeves being counterbalanced with reference to their respective counterweights.

2. An apparatus according to claim 1 in which the tool-bearing sleeves are independently rotatable about the drive shaft.

3. An apparatus according to claim 1 in which the tool-bearing sleeves are rotatable by a gear system comprising internally and externally toothed gears meshing with each other.

4. An apparatus according to any one of claims 1 to 3 which includes three tool-bearing sleeves which are respectively arranged in eccentric relationship to the drive shaft, the sleeves being mutually counterbalanced by positioning one sleeve between the other two sleeves, each of the outer sleeves having half the mass of the central sleeve and being arranged in opposing disposition to the central sleeve.

5. An apparatus according to any one of claims 1 to 2 which includes a support structure and drive means for the drive shaft.

6. An apparatus according to claim 5 in which the support and drive means lie between a pair of tool-bearing sleeves.

7. An apparatus according to any one of claims 1 to 3 in which the drive shaft is supported on either side of each tool-bearing sleeve.

8. An apparatus according to claim 1, 2 or 3 characterized in that the eccentric drive portions are arranged in opposing disposition to each other, thereby hitting the at least one of rock and mineral alternately.

* * * * *